US008871657B2

(12) United States Patent
Belford et al.

(10) Patent No.: US 8,871,657 B2
(45) Date of Patent: Oct. 28, 2014

(54) METHOD OF MANUFACTURE OF A COMPOSITE CONCRETE ARTICLE

(75) Inventors: Patricia Clare Belford, Northern Ireland (GB); Ruth Ellen Morrow, Northern Ireland (GB)

(73) Assignee: University of Ulster, County Londonderry (GB)

( * ) Notice: Subject to any disclaimer, the term of this patent is extended or adjusted under 35 U.S.C. 154(b) by 326 days.

(21) Appl. No.: 13/262,347

(22) PCT Filed: Mar. 22, 2010

(86) PCT No.: PCT/EP2010/001777

§ 371 (c)(1),
(2), (4) Date: Sep. 30, 2011

(87) PCT Pub. No.: WO2010/115513

PCT Pub. Date: Oct. 14, 2010

(65) Prior Publication Data

US 2012/0027992 A1 Feb. 2, 2012

(30) Foreign Application Priority Data

Apr. 6, 2009 (GB) .................................. 0905951.0

(51) Int. Cl.

| | |
|---|---|
| ***B32B 13/02*** | (2006.01) |
| ***B32B 13/14*** | (2006.01) |
| ***B32B 5/02*** | (2006.01) |
| ***B28B 23/00*** | (2006.01) |
| ***E04C 2/04*** | (2006.01) |

(52) U.S. Cl.
CPC ............ *E04C 2/044* (2013.01); *B28B 23/0006* (2013.01); *B28B 23/0075* (2013.01)
USPC ................................ 442/42; 442/43; 442/44

(58) Field of Classification Search
CPC .... B32B 5/12; B32B 2262/106; B32B 9/005; B32B 2307/3065; B32B 2607/00; D03D 15/00; E01C 9/086; E04C 2/044; E04C 2/06; E04C 2/36
See application file for complete search history.

(56) References Cited

U.S. PATENT DOCUMENTS 4,378,405 A 3/1983 Pilgrim
4,466,860 A 8/1984 Aggio
(Continued)

FOREIGN PATENT DOCUMENTS

EP 1818437 A1 8/2007
EP 1958926 A1 * 8/2008 .............. C04B 28/04
(Continued)

OTHER PUBLICATIONS

International Search Report of the International Searching Authority from corresponding Patent Cooperation Treaty (PCT) Application No. PCT/EP2010/001777, mailed Jun. 23, 2010.

(Continued)

*Primary Examiner* — Duy Deo
(74) *Attorney, Agent, or Firm* — Gardner, Linn, Burkhart & Flory, LLP

(57) ABSTRACT

A method of manufacturing a composite concrete article comprising forming a textile structure, removing material from regions of the textile structure to create voids in the textile structure and incorporating the textile structure into a body of wet uncured concrete such that the concrete flows into the voids created in the textile structure, embedding the textile structure into the concrete, whereby the textile structure defines at least a portion of a surface of the cured concrete article.

11 Claims, 1 Drawing Sheet

(56) References Cited

U.S. PATENT DOCUMENTS

| | | | | |
|---|---|---|---|---|
| 4,819,395 | A | 4/1989 | Sugita et al. | |
| 6,228,507 | B1 | 5/2001 | Hahn | |
| 6,478,867 | B1 * | 11/2002 | Cheyrezy et al. | 106/644 |
| 7,625,827 | B2 | 12/2009 | Egan et al. | |
| 2002/0019181 | A1 * | 2/2002 | Cooper et al. | 442/43 |
| 2004/0084127 | A1 | 5/2004 | Porter | |
| 2004/0142618 | A1 | 7/2004 | Porter | |
| 2004/0152379 | A1 | 8/2004 | McLarty | |
| 2005/0009428 | A1 | 1/2005 | Porter et al. | |
| 2009/0004378 | A1 | 1/2009 | Jones | |
| 2010/0029810 | A1 | 2/2010 | Pantke et al. | |
| 2012/0189801 | A1 * | 7/2012 | Belford et al. | 428/90 |

FOREIGN PATENT DOCUMENTS

| | | | |
|---|---|---|---|
| JP | 2001159047 | A | 6/2001 |
| JP | 2002348749 | A | 12/2002 |
| JP | 2003119641 | A | 4/2003 |
| WO | 2010099945 | A1 | 9/2010 |

OTHER PUBLICATIONS

Preliminary Amendment filed Sep. 2, 2011 in commonly-assigned U.S. Appl. No. 13/254,576, which corresponds to PCT Application No. PCT/EP2010/001311 (WO 2010/099945).

* cited by examiner

METHOD OF MANUFACTURE OF A COMPOSITE CONCRETE ARTICLE

FIELD OF THE INVENTION

This invention relates to a method of manufacture of a composite concrete article, and in particular to a method of manufacture of a concrete article having textile structures integrated into the surface of the concrete to provide a novel aesthetic and/or functional surface finish.

BACKGROUND OF THE INVENTION

Concrete is a commonly utilised as a construction material due to its low cost, ease of prefabrication into desired shapes, and strength. However, concrete structures and elements have a cold, hard and unattractive surface finish with poor acoustic and thermal properties.

Prior art attempts to apply textile materials to the surface of concrete articles have mainly been focussed on applying such materials to the surface of the finished concrete articles. Few attempts have been made to integrate textile materials into concrete articles, mainly due to the harsh environment posed by uncured concrete (highly alkaline) and the difficulty in adhering a textile material to the concrete structure in a manner such that the textile material will not simply peel off the concrete once it has set.

SUMMARY OF THE INVENTION

The present invention improves one or more of the appearance, thermal experience and/or acoustic properties or other surface characteristics of concrete by integrating textile structures into concrete articles such that at least portions of the textile structures define at least a portion of the exposed surfaces of the articles.

According to one aspect of the present invention, there is provided a method of manufacturing a composite concrete article comprising forming a textile structure, removing material from regions of the textile structure to create voids in the textile structure and incorporating the textile structure into a body of wet uncured concrete such that the concrete flows into the voids created in the textile structure, embedding the textile structure into the concrete, whereby the textile structure defines at least a portion of a surface of the cured concrete article.

Preferably the voids comprise regions of reduced thread density, such regions having greater porosity to wet concrete. The step of removing material from regions of the textile may comprise forming a particular visual or textural effect in the textile structure.

Preferably said textile structure is formed from a mixture of at least two different materials or fibres, said step of removing material from regions of the textile structure comprising a process for preferentially removing one of said materials or fibres from said regions. Preferably at least one of said at least two different materials is more resistant to said material removal process than the other or others of said at least two different materials from which the textile structure is formed.

In one embodiment said at least one more resistant material comprise a metallic material, such as metallic wires or threads. Alternatively, or additionally, said at least one more resistant material may comprises a natural or man made yarn selected to have a greater resistance to said removal process than the other or others of said two or more different materials.

The textile structure may comprise a woven textile structure, at least a portion of the warp and/or at least a portion of the weft of the textile structure being formed from said at least one more resistant material.

The removal process may comprise a mechanical process or a chemical process. Preferably the removal process comprises a chemical etching process, such as a devoré process. Two or more different removal processes may be carried out to remove different materials or fibres from different portions or regions of the textile structure. For example, different devoré mixes or recipes may be used to selectively remove different fibres from different regions of the textile structure to create a specific visual and/or textural effect.

According to a further aspect of the present invention there is provided a composite concrete article comprising a textile structure embedded in the surface of a concrete structure, said textile structure having voids formed therein by means of which the textile structure is embedded into the concrete structure to anchor the textile structure to the concrete structure.

The voids may create a particular visual or textural effect in the textile structure. The voids preferably comprise regions of reduced thread density having greater porosity to wet concrete.

Preferably the textile structure is formed at least two different materials or fibres, wherein at least one of said two materials is more resistant to the removal process used for creating said voids than another of said at least two materials.

In one embodiment said at least one more resistant material comprise a metallic material while the other or others of said two or more materials comprises a non-metallic material, such as a natural or man made yarn. The other or others of said two or more materials may comprise, for example, cotton, linen or a synthetic yarn. In one embodiment said at least one more resistant material comprises steel wires or threads.

In an alternative embodiment said at least one more resistant material comprises a natural or man made yarn selected to have a greater resistance to said removal process than said other or others of said two or more materials.

The textile structure may comprise a woven textile structure, at least a portion of the warp and/or at least a portion of the weft of the textile structure being formed from said at least one more resistant material.

BRIEF DESCRIPTION OF THE DRAWINGS

An embodiment of the present invention will now be described, by way of example only, with reference to the accompanying drawings, in which.

DETAILED DESCRIPTION OF THE PREFERRED EMBODIMENTS

A method of manufacturing a composite concrete article according to an embodiment of the present invention comprises forming a woven fabric from stainless steel wires and linen. The warp of the fabric is made up of linen only and the weft comprises alternate yarns of linen & stainless steel wire (see FIG. 1).

After production of fabric, the next stage is that the woven fabric goes through a devoré process. The fabric is screenprinted with a selected pattern (i.e. certain sections of the surface are exposed) to a devoré recipe comprising:

400 gm Indalca PA3R (13%)

150 gm Aluminium Sulphate 50 gm Glycerine 400 gm Water

Figure 1:
FIG. 1 shows a fabric material for use in a method of manufacture of a composite concrete article according to an embodiment of the present invention.

The treated fabric is then dried at room temperature before being baked for around 10 mins at approximately 180° C. The fabric is then washed in water, optionally containing a mild detergent, to remove the linen that has come into direct contact with the devoré recipe. This results in a textile that has a pattern of solid and void, as shown in FIG. 1.

Figure 2:
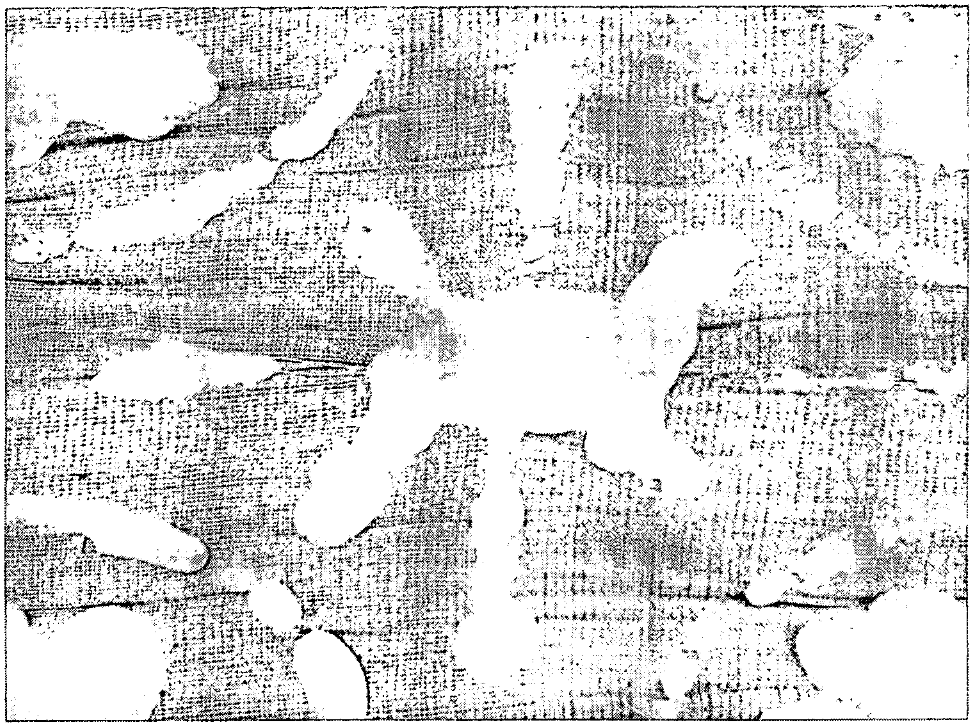
FIG. 2 shows a composite concrete article made in accordance with said method.

The treated fabric is then placed in the bottom of a mould, with the face intended to form the outer face of the composite concrete article facing downwards, and uncured concrete is poured into the mould. The concrete flows into the voids in the fabric such that the fabric becomes firmly embedded in the concrete, as shown in FIG. 2.

While a devoré process is described for forming the pattern and voids within the fabric, any other suitable mechanical or chemical process may be utilised to form suitable voids within the fabric to ensure that the concrete can flow into the fabric to firmly embed the fabric within the concrete.

The steel weft yarns may be shaped or crumpled to give the fabric a three dimensional shape to provide enhanced textural structures with unique acoustic characteristics in the surface of the concrete, with substantial depth. Linen and stainless steel may be used due to their high resistance to the corrosive effects of the highly alkaline environment of the concrete mix. However, other metals and textiles may be used, providing they are sufficiently resistant to such an environment.

In an alternative embodiment, a textile structure comprising a viscous pile formed on a polyester/polyamide backing may be used, wherein a suitable devoré process is used to selectively remove portions of the viscous pile from selected regions of the polyester/polyamide backing to create voids/regions of reduced thread density into which wet uncured concrete may flow to embed the textile structure into the finished concrete article and to create a desired visual and/or textural effect on the surface of the finished concrete article.

The invention is not limited to the embodiment(s) described herein but can be amended or modified without departing from the scope of the present invention. The process of selectively removing regions of a particular fibres from a mixed fibre fabric or construction using a removal process, such as a suitable devoré process, can be used to create voids or regions or reduced thread density in numerous different mixed fibre materials to enable such material to be embedded into a concrete article while creating a selected visual and/or textural affect on the surface of the finished concrete article to achieve a wide range of aesthetic and functional effects to enhance the visual, textural and acoustic characteristics of the article.

The invention claimed is:

1. A method of manufacturing a composite concrete article, said method comprising:

forming a textile structure from a mixture of at least two different fibres;

removing material from regions of the textile structure by a removal process Preferentially removing one of said fibres from said regions to create voids in the textile structure; and incorporating the textile structure into a body of wet uncured concrete such that the concrete flows into the voids created in the textile structure, embedding the textile structure into the concrete, whereby the textile structure defines at least a portion of a surface of the cured concrete article.

2. A method as claimed in claim 1, wherein the voids comprise regions of reduced thread density, the regions of reduced thread density having greater porosity to wet concrete.

3. A method as claimed in claim 1, wherein said step of removing material from regions of the textile comprises forming a particular visual or textural effect in the textile structure.

4. A method as claimed in claim 1, wherein at least one of the at least two different materials is more resistant to said material removal process than the other or others of the at least two different materials from which the textile structure is formed.

5. A method as claimed in claim 4, wherein the at least one more resistant material comprises metallic wires or threads.

6. A method as claimed in claim 4, wherein the at least one more resistant material comprises a natural or man made yarn selected to have a greater resistance to said removal process than the other or others of the two or more different materials.

7. A method as claimed in claim 1, wherein the textile structure comprises a woven textile structure having a warp and a weft, at least a portion of the warp or at least a portion of the weft of the textile structure being formed from the at least one more resistant material.

8. A method as claimed in claim 1, wherein said removal process comprises a mechanical process.

9. A method as claimed in claim 1, wherein said removal process comprises a chemical process.

10. A method as claimed in claim 9, wherein said removal process comprises a chemical etching process.

11. A method as claimed in claim 10, wherein said removal process comprises a devoré process.

* * * * *